J. G. GARLAND.

Apparatus for Moistening the Atmosphere.

No. 8,847. Reissued Aug. 12, 1879.

Attest:

C. Clarence Poole

Warren Geely.

Inventor:

James G. Garland.

by Ellis Spear

Atty

N. PETERS, PHOTO-LITHOGRAPHER, WASHINGTON, D. C.

UNITED STATES PATENT OFFICE.

JAMES G. GARLAND, OF BIDDEFORD, MAINE.

IMPROVEMENT IN APPARATUS FOR MOISTENING THE ATMOSPHERE.

Specification forming part of Letters Patent No. 140,410, dated July 1, 1873; Reissue No. 8,847, dated August 12, 1879; application filed May 12, 1879.

*To all whom it may concern:*

Be it known that I, JAMES G. GARLAND, of Biddeford, Knox county, Maine, have invented certain new and useful Improvements in Devices for Moistening the Atmosphere; and I hereby declare that the following is a full, clear, and exact description of the same.

My invention relates to an apparatus for supplying a greater amount of moisture to the atmosphere in apartments and rooms than it contains in its natural state, which is adapted for use wherever for mechanical, sanitary, or other purposes it is necessary or desirable that this result should be accomplished.

In weaving-rooms and in flouring-mills experience has proved that much better results are obtained when the atmosphere contains from seventy (70) to ninety (90) per cent. of moisture; and it is the object of my invention to provide a cheap, efficient, and easily-regulated device for supplying such moisture.

My invention consists of an arrangement of air-chamber, pressure-blower, water-supply, reservoir, and atomizers, all as fully hereinafter described, and particularly indicated in the claims.

Figure 1:
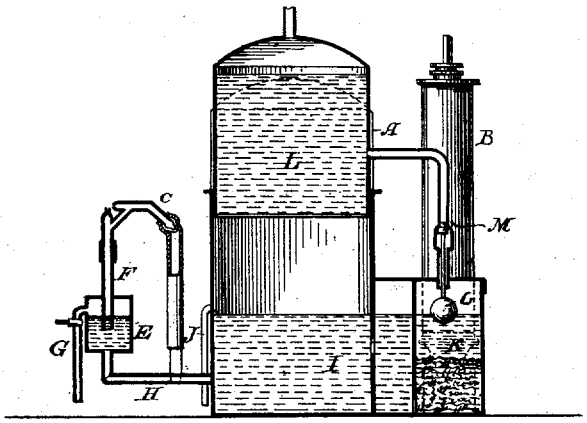
Figure 2:
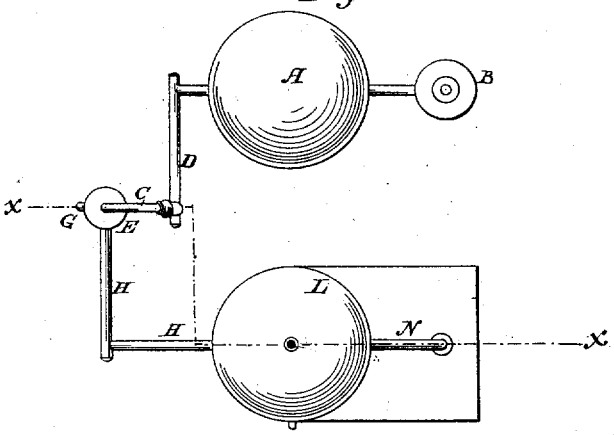

In the drawings, Figure 1 is a sectional elevation of my apparatus, taken on the line *x x* of Fig. 2. Fig. 2 is a plan view.

A represents the air-chamber, which is supplied with air by the pump B, which I design, in practice, to operate by power. A tube, D, leads from this chamber on the opposite side from the air-entrance, and is connected to the air-tube C of the atomizer.

E is a fluid tank or chamber, adapted to be supplied with fluid from the cistern I by a pipe, H.

F is the fluid-pipe of the atomizer, which leads from the chamber E in a vertical direction, its nozzle being in close proximity to the end of the air-pipe C, so that the jet of water, as it escapes from the pipe F, will be converted into spray by the current of air from the pipe C, and will be forced into the atmosphere in the form of vapor.

The fluid-chamber E is also provided with an overflow-pipe, G, and the amount of fluid contained in such chamber may be regulated by a cock.

For supplying water to the atomizer I have shown a reservoir, L, and a pipe, N, conducts the water from such reservoir into a filtering apparatus, K, whence it flows into the cistern I. The fluid-chamber E must be placed relatively to the cistern in height, to provide for the same water-level. The cistern I is also provided with an overflow-pipe, J, to allow the surplus water to escape.

In order to automatically regulate the water-supply of the cistern I, I provide the pipe N with a valve, M, which is operated by a float, O, which closes such valve when a sufficient amount of water has been received into the cistern. The supply of water is thus kept at regular and uniform rate.

The air-chamber may be provided with a safety-valve, to allow the air to blow off when the pressure reaches the maximum.

It will be also understood that as many atomizers may be supplied by one air-chamber and water-supply as may be required by the size of the room to be charged with moisture.

Having thus described my invention, what I claim as new, and desire to secure by Letters Patent of the United States, is—

1. In the described air-moistening apparatus, an air-chamber, one or more atomizers, an atomizer or fluid-chamber, and a water-supply connected with the atomizer-chamber, for producing a constant and uniform supply for the atomizer, the parts being adapted to operate in combination with each other, as set forth.

2. The combination, with the atomizer, pressure-blower, and water-supplying cistern, to furnish a constant and uniform supply for the atomizer, of a reservoir, for supplying the cistern, and an automatic supply-regulating valve, substantially as specified.

3. The combination of the filter with the reservoir, the cistern, and the atomizer, substantially as set forth 4. The combination of the overflow-pipe G with the atomizer, cistern, and the water-supply cistern, substantially as set forth.

5. The combination of one or more atomizers, an atomizer or fluid chamber, a water-supply, to furnish a constant and uniform supply for the atomizer, and a pressure-blower, substantially as set forth.

JAMES G. GARLAND.

Witnesses:

R. H. INGERSOLL,

CHAS. A. MOODY.